(12) United States Patent
Lin et al.

(10) Patent No.: US 7,319,457 B2
(45) Date of Patent: Jan. 15, 2008

(54) METHOD OF SCROLLING WINDOW SCREEN BY MEANS OF CONTROLLING ELECTRONIC DEVICE

(75) Inventors: Jao-Ching Lin, Hsin-Chuang (TW); Shyh-In Huang, Hsin Chuang (TW); Lin-Abel Chu, Hsin Chuang (TW); Chuang-Yi Shen, Hsin Chuang (TW)

(73) Assignee: Sentelic Corporation, Taipei (TW)

( * ) Notice: Subject to any disclaimer, the term of this patent is extended or adjusted under 35 U.S.C. 154(b) by 703 days.

(21) Appl. No.: 10/776,692

(22) Filed: Feb. 12, 2004

(65) Prior Publication Data

US 2005/0198588 A1    Sep. 8, 2005

(51) Int. Cl.
*G09G 5/00* (2006.01)
(52) U.S. Cl. .................. 345/173; 345/156; 345/163; 345/177
(58) Field of Classification Search ........... 345/173, 345/156, 163, 177
See application file for complete search history.

(56) References Cited

U.S. PATENT DOCUMENTS

| 5,943,052 | A | * | 8/1999 | Allen et al. | ............... 715/787 |
| 6,424,338 | B1 | * | 7/2002 | Anderson | ............... 345/173 |
| 6,972,749 | B2 | * | 12/2005 | Hinckley et al. | ............ 345/173 |

* cited by examiner

*Primary Examiner*—Richard Hjerpe
*Assistant Examiner*—Leonid Shapiro

(57) ABSTRACT

A method of scrolling a window screen for controlling electronic device provides a first press zone and a second press zone in a touch device of the electronic device. When the first press zone is pressed, the window screen can be controlled to scroll along a first direction and when the second press zone is pressed, the window screen can controlled to scroll along a second direction, which has a direction different from the first direction. Hence, the scrolling of the window screen is capable of being controlled easily by way of clicking the press zones.

43 Claims, 3 Drawing Sheets

METHOD OF SCROLLING WINDOW SCREEN BY MEANS OF CONTROLLING ELECTRONIC DEVICE

BACKGROUND OF THE INVENTION

1. Field of the Invention

The present invention relates to a method of scrolling window screen by way of controlling electronic device, and particularly to a method with which the window screen can be scrolled easily, fast and effortlessly with controlling electronic device.

2. Description of Related Art

Graphical User Interface (GUI) is well known to most of the people. One of the main functionalities for the GUI is the ability for the scrolling of the window screen (including up-down scrolling and left-right scrolling) for the easy browsing by a user. Therefore, at the edge of the window (up-down edge or left-right edge), usually situates a graphical control tool called the scroll bar to allow the user to press on with a mouse and drag along the parallel direction of the scroll bar so that the window screen can be scrolled. However, the scroll bar usually just occupies one or two small locations on the screen (up-down scroll bar or left-right scroll bar) and it results in the difficulties and time consuming problem for the user to accurately move the cursor on top of the scroll bar. But, if the size of the scroll bar is increased for solving this problem, effective viewing area of the screen will become sacrificed. Hence, In order to allow operation of the GUI scrolling easier, a scroll wheel is installed on the surface of the mouse for scrolling the window screen without moving the mouse cursor but this requires complicated and expensive mechanical components added to the existing mouse and it is not easy for storing when using it with a portable computer.

U.S. Pat. No. 5,943,052 discloses a method for controlling the scroll bar with a scrolling zone, which is disposed on a touch device electrically connected to a computer, allows the user to move up and down (vertical scrolling zone) or left and right (horizontal scrolling zone) on the touch device with a finger so as to perform the up-down scrolling or left-right scrolling of a window screen and achieve an effective way for controlling the scroll bar. However, the method requires the finger to scroll continuously in order to simulate the scrolling of the mouse scroll wheel so that the system has to repetitively detect and determine the movement of the finger in any direction. It not only increases the complexity of the system program but also the user has to continuously exert force on the finger to perform the scrolling on the touch device. In this way, it easily causes fatigue and injury to the finger.

SUMMARY OF THE INVENTION

As a consequence, the object of the present invention is to provide a convenient method of window screen scrolling for controlling electronic device.

Therefore, the method of window screen scrolling for controlling electronic device according to the present invention comprises of the following steps: (A) N scrolling zones are installed on the touch device, where N is an integer equal or greater than 1; (B) detect the N scrolling zones, when the J scrolling zone is being pressed, then the window screen is controlled to scroll in the direction of J.

Besides, the electronic device according to the present invention includes at least one monitor, at least one touch device and a processing unit. The monitor is used to display at least one window screen. The touch device has N scrolling zones, where N is an integer equal or greater than 1, and the touch device can perform detection on the N scrolling zones. The processing unit, the monitor and the touch device are all electrically connected and once the J scrolling zone of the N scrolling zones is pressed, the window screen is to scroll in the direction of J.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
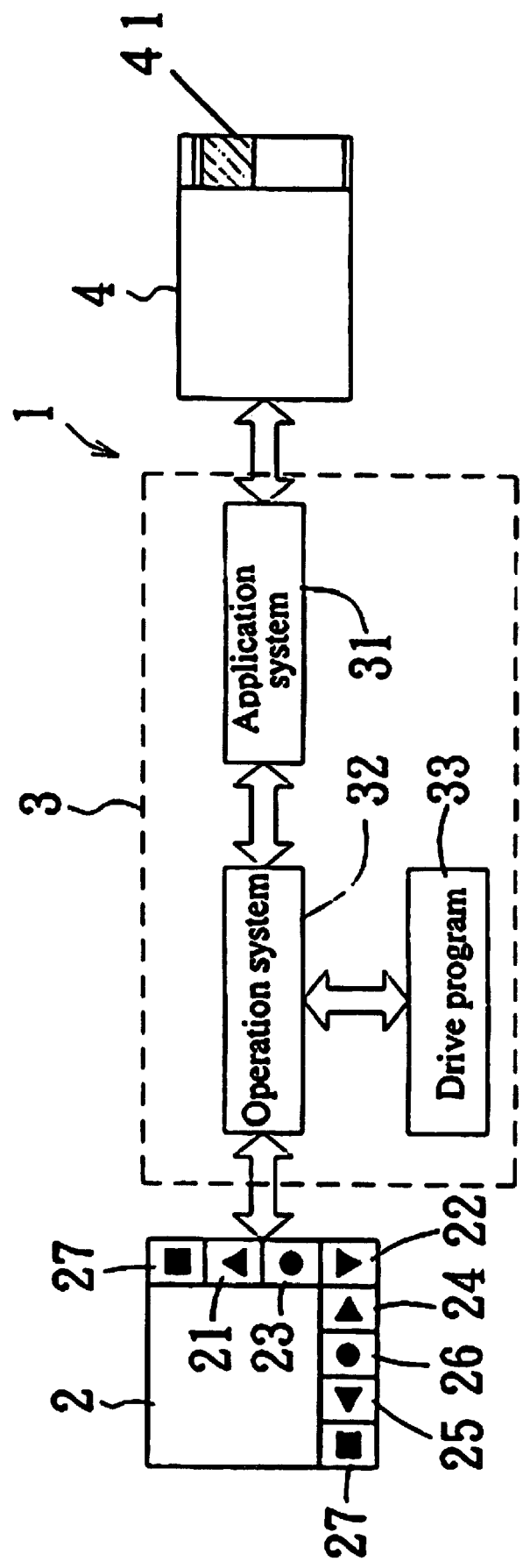
FIG. 1 is a structure diagram of a first preferred embodiment of the present invention.

Referring to FIG. 1 which is a structural diagram of the first preferred embodiment of the electronic device according to the present invention, wherein the electronic device 1 include a touch device 2, a processing unit 3 connected electrically to the touch device 2 and a monitor for displaying the window screen 4. In addition, the touch device 2 controls the window screen through the processing unit 3. The processing unit 3 is installed with an operation system 32 and an application program 21, which forms a Graphical User Interface (GUI) including a scroll bar on the window screen 4.

The preceding preferred embodiment at the right edge (or the left edge) of the touch device 2 is provided with a first press zone 21, a second press zone 22 and a third press zone 23 (called middle stop zone hereinafter), which is situated between the first and second press zones, and the three press zone are arranged vertically to be adapted to movement (up-down movement) of the scroll bar 41 on the window screen 4 so as to allow the hand and eyes being coordination while the user operates on the press zones. Certainly, as shown in FIG. 1, at the top or bottom edge of the touch device 2, press zones 24~26 for the left and right scrolling of the window screen 4 can be installed.

Besides, the processing unit 3 is installed with an optional driver program 33 which can be used with the touch device 2 to control the scrolling of the scroll bar 41 and allow the user an convenient way to modify the related settings for press zones 21~23. However, it has to be noted that the touch device 2 itself can have a built-in detection circuit (not shown in the figure) and a scroll bar controlling circuit so the touch device 2 itself can perform the control on the scroll bar without requiring the driver program 33. Therefore, when the touch device 2 with the driver program 33 detecting the first press zone 21 is pressed continuously, it will then continuously produce a first control signal to the processing unit 3 to allow the window frame 4 to maintain its scrolling in the first direction (upward) and at the same time, the scroll bar will follow to move upwards.

Similarly, while the touch device 2 has detected the first press zone 22 being pressed continuously, a second control signal is produced continuously and sent to the processing unit 3 so that the window screen 4 can maintain scrolling in the second direction (downward) opposite to the first direction (upward) and at the same time, the scroll bar will follow to move downwards.

Furthermore, while the touch device 2 has detected the middle stop zone 23 being pressed or both the first press zone 21 and the second press zone 22 being not pressed, the window screen 4 stops scrolling immediately.

Therefore, from the above explanation, it can be understood that the first embodiment of the present invention allows the user to use the finger to touch any of the press zone 21~23 on the touch device 2 without moving the finger and the up-down scrolling or stop scrolling of the window screen 4 can be controlled.

Something worth noting is that, in the above mentioned embodiment of the present invention, the middle stop zone 23 is not necessarily required and the touch device 2 can decide the scrolling or stopping of the window screen by determining if the finger presses on or releases from the press zone 21~23.

Additionally, in the embodiment of the present invention, a special press zone 27 can be further installed on the touch device 2. When the touch device 2 has detected the special press zone 27 being pressed, then immediately the processing unit 3 resets the status of the scrolling bar, wherein the mentioned resetting the status of the scrolling bar can be any of the following actions:

(1) Restore the scroll bar 41 to its starting position, middle position, finish position, any other position pre-defined by the system, or custom position set by the user.

(2) Restore the scrolling speed of the scroll bar back to default.

(3) Enable or disable the first press zone/or the second press zone's scrolling abilities.

(4) Change the scrolling direction of the first press zone/or the second press zone.

(5) Stop the scrolling of the window screen.

(6) Repeat the previous scrolling action on the window screen, wherein the repeated action includes scrolling direction, speed, and/or scrolling distance.

(7) Maintain the scrolling of the window screen according to the direction and speed of the previous scrolling action.

(8) Move the window screen one page up, one page down, scroll upwards or scroll downwards.

(9) Generate electrical signal for the single or double clicking action.

(10) Generate electrical signal for the previous mouse drag action.

(11) Generate electrical signal for the previous click and drag action.

Besides, the action for the above mentioned resetting scroll bar's setting status can be started when the touch device 2 has detected multiple press zones being pressed simultaneously.

Moreover, aside from the above mentioned detection method, the touch device 2 can detect the continuous and short pressing action (or clicking) on the first press zone 21 or the second press zone 22 to allow the processing unit 3 to be based on the number of continuous clicking of the first press zone 21 or the second press zone 22 to correspondingly adjust the scrolling speed of the window screen 4. For example, when the touch device 2 has detected the first press zone 21 having been clicked, it will start counting the number of clicks within a fixed time after the first click, and based on the number of clicks generate a control signal to the processing unit 3, in order to adjust the corresponding scrolling speed of the window screen 4 in the first direction. For instance, when clicking once, it will make the window screen 4 to scroll at normal speed, continuous clicking twice will make the window frame 4 to scroll at two times the normal speed, while clicking three times, it will make the window screen 4 to scroll at three times the normal speed. Similarly, when the second press zone 22 is pressed, the window screen 4 will scroll towards a direction that is opposite to the first direction and the speed will be adjusted according to the number of clicks on the second press zone 22. Therefore, the user can be based on his preference to use the finger clicking continuously multiple times on the first press zone 21 or the second press zone 22 so as to control the scrolling speed of the window screen 4 and thus the finger does not have to move on the touch device 2.

In addition, the touch device 2 can also detect the time duration when the first press zone or the second press zone is pressed to allow the processing unit 3 based on this time duration to correspondingly adjust the scrolling speed of the window screen 4. For example, the longer the pressing duration, the faster the scrolling speed while the shorter the pressing duration, the slower the scrolling time.

Likewise, the touch device 2 can detect the position of the pressing on the first press zone 21 or the second press zone 22 to allow the processing unit 3 based on the position to correspondingly adjust the scrolling speed of the window screen 4. For example, the closer the pressing position closer to the center of the touch device 2 (which is the third press zone 23), the slower the scrolling speed while the further the pressing position from the center of the touch device 2, the faster the scrolling time.

In addition, when the touch device 2 has detected the first press zone 21 or the second press zone 22 being pressed, it will allow the processing unit 3 to control the window frame 4 to maintain its scrolling until the same press zone is pressed again to stop scrolling and by the toggling on/off to control if the window screen 4 will scroll or not. Certainly, the processing unit 3 can control the window screen 4 to maintain scrolling until the other press zone is pressed to stop scrolling or control the window screen 4 to maintain scrolling until the area outside the press zone is pressed again to stop scrolling.

Furthermore, in reality, when the user presses the first press zone 21 or the second press zone 22, the touch device 2 will send out a first scrolling instruction to allow the processing unit 3 controlling the window screen 4 scrolling once right after the pressing. And after a short period of time, continue to send out the second scrolling instruction to allow the processing unit 3 to maintain the continuous scrolling of the window screen 4. The time span between the first and second scrolling instructions can be set as equal, shorter or longer than the time after the continuous instructions are set.

Figure 2:
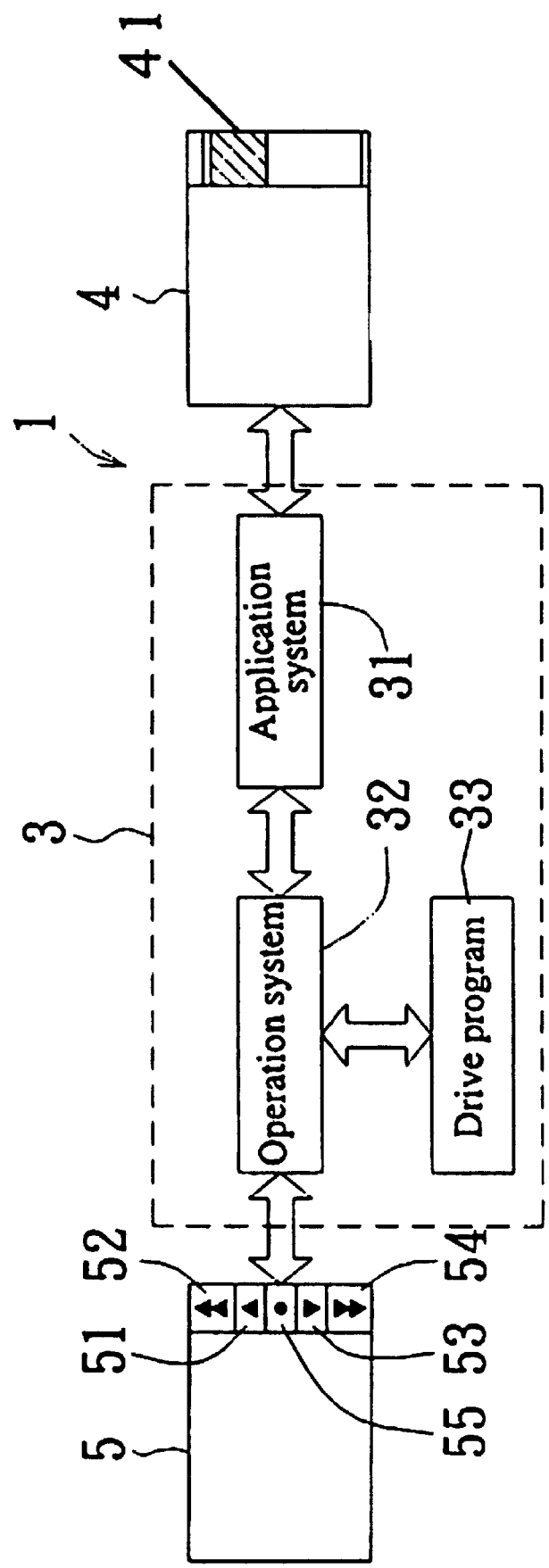
FIG. 2 is a structure diagram of a second preferred embodiment of the present invention.

Subsequently, referring to FIG. 2 which shows the second preferred embodiment according to the present invention and it differs from the first preferred embodiment in that on the touch device 5, at the location of the first press zone 21 in the first embodiment, is installed a first normal speed zone (the upward normal speed zone) 51 and the first faster speed zone (the upward faster speed zone) 52, and at the location of the second press zone 22 in the first embodiment, is installed a second normal speed zone (the downward normal speed zone) 53 and a second faster speed zone (the downward faster speed zone) 54, and a middle stop zone 55 between the upward normal speed zone and the downward normal speed zone. Therefore, when the touch device 5 has detected the upward normal speed zone 51 or the upward faster speed zone 52 having been pressed, through the processing unit 3, it controls the window screen 4 to scroll upward at normal speed or a faster speed. Similarly, when the touch device 5 has detected the downward normal speed zone 53 or the downward faster speed zone 54 having been pressed, through the processing unit 3, it controls the window screen 4 to scroll downward at normal speed or a faster speed. The above mentioned window screen 4 will stop its scrolling when the touch device 5 has detected the middle stop zone 55 being pressed or the press zones 51-54 having not been pressed.

From the above mentioned explanations, in the second preferred embodiment according to the present invention, the user just needs to touch the press zones 51-54 for decide the scrolling speed of the window screen 4 and the finger does not has to be moved. Definitely, in the second embodiment of the present invention, the middle stop zone 55 is not necessarily required and the touch device 5 can determine whether the finger presses or leaves the press zone 51-55 to control the window screen 4 to scroll or stop.

Figure 3:
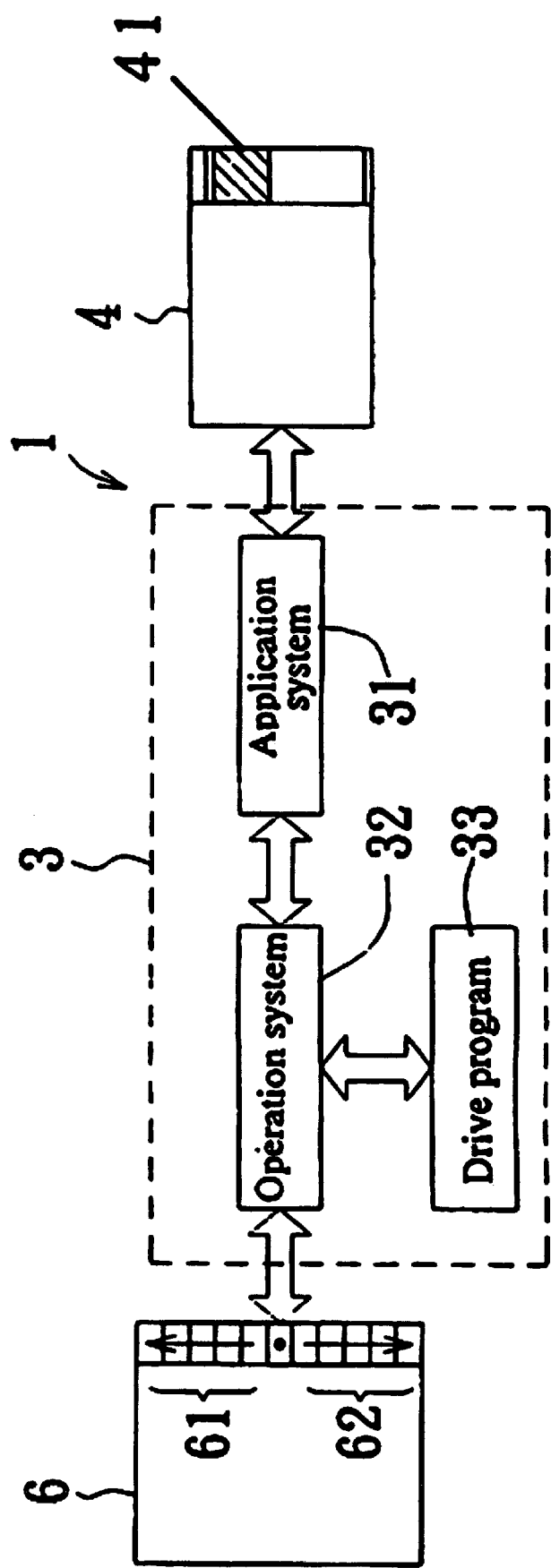
FIG. 3 is a structure diagram of the second preferred embodiment of the present invention illustrating another example.

Certainly, referring to FIG. 3, in the third preferred embodiment according to the present invention, the touch device 6 can install at the location of the first press zone 21 (the upward press zone 61) and the second press zone 22 (the downward press zone 62) of the first embodiment according to the present invention, respectively more than two speed zones and each of the speed zones is given a different scrolling speed. When the touch device 6 has detected one of the speed zone being pressed, the processing unit 3 is instructed to control the window screen 4 to scroll towards the direction of the speed zone with the pre-defined speed of that zone. Furthermore, when the speed zone located closer to the center of the touch device 6 (the middle stop zone 55), it will have slower scrolling speed. While the speed zones are further away from the center of the touch device 6 (the middle stop zone 55), it will have faster scrolling speed. Moreover, the scrolling speed given to each of the speed zones can be fixed or kept changing to faster speed in an accelerated way.

Summarizing all the description above, installing multiple press zones 21~23 (51~55, 61~62) and simulating the actual pressing of the real body on the touch device 2 (5, 6) allow the user by using his finger to touch the press zone and not moving it on the touch device for controlling the scrolling or stopping of the window screen 4. This not only greatly increases the convenience of the operation but also allows the user's finger not to continuously perform scrolling movement for simulating the scrolling of the mouse scroll wheel. Hence, the fatigue and risk of injury that may be caused to the finger can be reduced. Moreover, the detection procedure is further simplified to reduce the complexity of the system programs and circuits.

While the invention has been described with reference to the preferred embodiments thereof, it is to be understood that modifications or variations may be easily made without departing from the spirit of this invention, which is defined by the appended claims.

What is claimed is:

1. A method of scrolling a window screen by means of controlling electronic device comprising following steps:
   (A) providing a touch device with at least a first press zone and a second press zone; and
   (B) detecting said press zones and controlling said window screen to scroll along a direction when one of said press zones is detected to have been pressed;
   wherein when said first press zone or said second press zone is detected to have been pressed more than once, a scrolling speed of of said window screen is regulated based on number of times and duration of said first press zone or said second press zone being pressed.

2. The method of scrolling window screen by means of controlling electronic device as defined in claim 1, wherein said first press zone or said second press zone is pressed with a first short tap then is pressed immediately with a second short tap or a movement of pressing having a duration longer than said first short tap.

3. The method of scrolling window screen scrolling by means of controlling electronic device as defined in claim 1, wherein said scrolling speed is regulated faster based on said number of times and said duration.

4. The method of scrolling window screen by means of controlling electronic device as defined in claim 1, wherein said scrolling speed is regulated slower based on said number of times and said duration.

5. The method of scrolling window screen scrolling by means of controlling electronic device as defined in claim 1, wherein said window screen stops scrolling based on said number of times and said duration.

6. The method of window screen scrolling for controlling electronic device as defined in claim 1, wherein at least a special press zone is provided on said touch device and said scroll bar is reset while said special press zone is detected to have been pressed.

7. The method of window screen scrolling for controlling electronic device as defined in claim 1, wherein said scroll bar is reset while said press zones are detected to have been pressed at the same time.

8. The method of scrolling window screen by means of controlling electronic device as defined in claim 6 or 7, wherein said scroll bar is reset to return to a beginning position, a middle position, a default position or a position set by a user.

9. The method of window screen scrolling for controlling electronic device as defined in claim 6 or 7, wherein said scroll bar is reset to allow said scrolling speed to return to a default speed.

10. The method of window screen scrolling for controlling electronic device as defined in claim 6 or 7, wherein said scroll bar is reset to initiate or terminate scrolling function of said first press zone or said second press zone.

11. The method of scrolling window screen by means of controlling electronic device as defined in claim 6 or 7, wherein said scroll bar is reset to change scrolling direction of said first press zone and/or said second press zone.

12. The method of scrolling window screen by means of controlling electronic device as defined in claim 6 or 7, wherein said scroll bar is reset to stop scrolling.

13. The method of window scrolling screen by means of controlling electronic device as defined in claim 6 or 7, wherein said scroll bar is reset to repeat a movement of scrolling done last time said repeated movement containing direction, speed, and/or distance of scrolling.

14. The method of scrolling window screen by means of controlling electronic device as defined in claim 6 or 7, wherein said scroll bar is reset to keep the same direction and speed of scrolling done last time.

15. The method of scrolling window screen by means of controlling electronic device as defined in claim 6 or 7, wherein said scroll bar is reset to allow said window screen to page up, page down, scroll upward or scroll downward.

16. The method of scrolling window screen by means of controlling electronic device as defined in claim 6 or 7, wherein said scroll bar is reset to generate electronic signal corresponding to a movement of single tap or double tap.

17. The method of scrolling window screen by means of controlling electronic device as defined in claim 6 or 7, wherein said scroll bar is reset to generate a movement of drag done last time repeatedly.

18. The method of scrolling window screen by means of controlling electronic device as defined in claim 6 or 7, wherein said scroll bar is reset to generate electronic signal corresnonding to a movement of repeated tap and drag done last time.

19. The method of scrolling window screen by means of controlling electronic device as defined in claim 1, wherein said touch device provides an upward scroll zone, a downward scroll zone, a leftward scroll zone and a rightward scroll zone and said window screen is controlled to scroll upward or downward in case of said upward scroll zone or said downward scroll zone being detected to have been pressed and said window screen is controlled to scroll leftward or rightward in case of said rightward scroll zone or said leftward scroll zone being detected to have been pressed.

20. An electronic device comprising:
at least a screen providing a window screen with a scroll bar;
at least a touch device providing at least a first press zone and a second press zone for being detected; and
a processing unit electrically connecting with said screen and said touch device respectively and controlling said window screen to scroll in a direction in case of one of said press zones being touched; wherein when said first press zone or said second press zone is detected to have been pressed more than once, a scrolling speed of said window screen is regulated based on the number of times and duration of said first press zone or said second press zone being pressed.

21. The electronic device as defined in claim 20, wherein said first press zone or said second press zone is detected to have been pressed immediately with a first short tap and then a second short tap or a movement of pressing having a duration longer than said first short tap.

22. The electronic device as defined in claim 20, wherein said processing unit regulates said scrolling speed faster based on said number of times and said duration.

23. The electronic device as defined in claim 20, wherein said processing unit regulates said scrolling speed slower based on said number of times and said duration.

24. The electronic device as defined in claim 20, wherein said processing unit stops said window screen scrolling based on said number of times and said duration.

25. The electronic device as defined in claim 20, wherein said touch device detects a pressed position on said first press zone or said second press zone and said processing unit determines said scrolling speed based on said pressed position and said scrolling speed gets slower in case of said pressed position getting nearer said touch device and said scrolling speed gets faster in case of said pressed position getting farther from said touch device.

26. The electronic device as defined in claim 20, wherein said touch device detects a pressed position on said first press zone or said second press zone and said processing unit determines said scrolling speed based on said pressed position and said scrolling speed gets faster in case of said pressed position getting farther from said touch device and said scrolling speed gets slower in case of said pressed position getting nearer the touch device.

27. The electronic device as defined in claim 20, wherein said processing unit allows said window screen to keep scrolling while said touch device detects said first press zone or said second press zone has been pressed.

28. The electronic device as defined in claim 27, wherein said processing unit allows said window screen to keep scrolling till the same press zone being pressed again.

29. The electronic device as defined in claim 27, wherein said processing unit allows the window screen to keep scrolling till another press zone being pressed again.

30. The electronic device as defined in claim 27, wherein said processing unit allows said window screen to keep scrolling till outside area of said press zone being pressed.

31. The electronic device as defined in claim 20, wherein said touch device further provides at least a special press zone and said processing unit resets said scroll bar while said touch device detects said special press zone having been pressed.

32. The electronic device as defined in claim 20, wherein said touch device further provides at least a special press zone and said processing unit resets said scroll bar while said touch device detects said press zones baving been pressed at the same time.

33. The electronic device as defined in claim 31 or 32, wherein said scroll bar is reset to return to a beginning position, a middle position, a default position or a position set by a user.

34. The electronic device as defined in claim 31 or 32, wherein said scroll bar is reset to allow said scrolling speed returning to a default speed.

35. The electronic device as defined in claim 31 or 32, wherein said scroll bar is reset to initiate or terminate scrolling function of said first press zone or said second press zone.

36. The electronic device as defined in claim 31 or 32, wherein said scroll bar is reset to change scrolling direction of said first press zone and/or said second press zone.

37. The electronic device as defined in claim 31 or 32, wherein said scroll bar is reset to allow said window screen to stop scrolling.

38. The electronic device as defined in claim 31 or 32, wherein said scroll bar is reset to perform a repeated movement of scrolling and said repeated movement contains direction, speed, and/or distance of scrolling.

39. The electronic device as defined in claim 31 or 32, wherein said scroll bar is reset to keep said window screen scrolling with the same direction and speed as a preceding movement of scrolling.

40. The electronic device as defined in claim 31 or 32, wherein said scroll bar is reset to allow said window screen to page up, page down, scroll upward or scroll downward.

41. The electronic device as defined in claim 31 or 32, wherein said scroll bar is reset to generate electronic signal corresponding to a movement of single tap or double tap.

42. The electronic device as defined in claim 31 or 32, wherein said scroll bar is reset to perform a movement of drag done last time repeatedly.

43. The electronic device as defined in claim 31 or 32, wherein said scroll bar is reset to generate electronic signal corresponding to a repeated movement containing a tap and a drag done last time.

* * * * *